US009829643B2

(12) United States Patent
Kadar-Kallen et al.

(10) Patent No.: US 9,829,643 B2
(45) Date of Patent: Nov. 28, 2017

(54) OPTICAL CONNECTIONS SYSTEM AND METHODS FOR POSITIONING AN OPTICAL FIBER WITHIN AN ALIGNMENT DEVICE (71) Applicant: TYCO ELECTRONICS CORPORATION, Berwyn, PA (US)

(72) Inventors: Michael Aaron Kadar-Kallen, Harrisburg, PA (US); Robert Charles Flaig, Lancaster, PA (US); Dwight A. Bretz, Hummelstown, PA (US); Randall Bobby Paul, Elizabethville, PA (US); Michael Lawerence Gurreri, York, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/025,131

(22) PCT Filed: Sep. 24, 2014

(86) PCT No.: PCT/US2014/057313
§ 371 (c)(1),
(2) Date: Mar. 25, 2016

(87) PCT Pub. No.: WO2015/048198
PCT Pub. Date: Apr. 2, 2015

(65) Prior Publication Data
US 2016/0216454 A1 Jul. 28, 2016

Related U.S. Application Data (60) Provisional application No. 61/882,930, filed on Sep. 26, 2013.

(51) Int. Cl.
*G02B 6/36* (2006.01)
*G02B 6/38* (2006.01)

(52) U.S. Cl.
CPC ......... *G02B 6/3809* (2013.01); *G02B 6/3825* (2013.01)

(58) Field of Classification Search
CPC ........................... G02B 6/3809; G02B 6/3825
See application file for complete search history.

(56) References Cited

U.S. PATENT DOCUMENTS 3,912,574 A * 10/1975 Cherin ................. G02B 6/3805
156/158
4,148,559 A * 4/1979 Gauthier .............. G02B 6/3805
385/55

(Continued)

FOREIGN PATENT DOCUMENTS

WO       02/056060 A2     7/2002
WO    WO 2012/112343     8/2012

(Continued)

OTHER PUBLICATIONS

International Search Report and Written Opinion for International Application No. PCT/US2014/057313 dated Jan. 9, 2015 (15 pages).

(Continued)

*Primary Examiner* — Rhonda Peace
(74) *Attorney, Agent, or Firm* — Merchant & Gould P.C.

(57) ABSTRACT

A method for positioning an optical fiber having an end portion within an alignment groove of an alignment device includes orienting the optical fiber in the alignment groove of the alignment device; causing the optical fiber to elastically flex; using an interference point to assist in forming a curved profile of the flexed fiber, and using inherent elasticity of the flexed optical fiber to assist in retaining the end portion of the optical fiber in contact with the alignment groove. A connection system includes a connector, align- (Continued)

ment device, and adapter, with an interference point on at least one of the connector, alignment device, or adapter.

33 Claims, 11 Drawing Sheets

(56) References Cited

U.S. PATENT DOCUMENTS

| | | | | |
|---|---|---|---|---|
| 4,490,007 | A * | 12/1984 | Murata | G02B 6/3841 |
| | | | | 385/64 |
| 5,067,226 | A * | 11/1991 | Egner | G02B 6/3809 |
| | | | | 29/419.1 |
| 6,582,134 | B2 * | 6/2003 | Otera | G02B 6/3809 |
| | | | | 385/65 |
| 6,951,425 | B2 * | 10/2005 | Vergeest | G02B 6/3809 |
| | | | | 385/59 |
| 7,572,064 | B2 * | 8/2009 | deJong | G02B 6/3846 |
| | | | | 385/55 |
| 7,641,397 | B2 * | 1/2010 | Koreeda | G02B 6/3825 |
| | | | | 385/136 |
| 9,523,824 | B2 * | 12/2016 | Ott | G02B 6/36 |
| 2002/0114582 | A1 | 8/2002 | Otera | |
| 2004/0071407 | A1 | 4/2004 | Vergeest | |
| 2010/0074581 | A1 | 3/2010 | Tanobe et al. | |
| 2013/0071066 | A1 | 3/2013 | Lu | |
| 2013/0216186 | A1 | 8/2013 | Ott | |
| 2015/0362681 | A1 * | 12/2015 | Watte | G02B 6/3866 |
| | | | | 385/58 |
| 2015/0378109 | A1 * | 12/2015 | Samal | G02B 6/3809 |
| | | | | 385/58 |
| 2016/0018604 | A1 * | 1/2016 | Gurreri | G02B 6/3809 |
| | | | | 385/58 |
| 2016/0216454 | A1 * | 7/2016 | Kadar-Kallen | G02B 6/3809 |

FOREIGN PATENT DOCUMENTS

| | | |
|---|---|---|
| WO | 2013/117589 A2 | 8/2013 |
| WO | WO 2013/117598 | 8/2013 |

OTHER PUBLICATIONS

Extended European Search Report for corresponding European Patent Application No. 14848853.9 dated Apr. 10, 2017, 8 pgs.

* cited by examiner

OPTICAL CONNECTIONS SYSTEM AND METHODS FOR POSITIONING AN OPTICAL FIBER WITHIN AN ALIGNMENT DEVICE

CROSS-REFERENCE TO RELATED APPLICATION(S)

This application is a National Stage of PCT International Patent application No. PCT/US2014/057313, filed Sep. 24, 2014 which claims benefit of U.S. Patent Application Ser. No. 61/882,930 filed on Sep. 26, 2013 and which applications are incorporated herein by reference. To the extent appropriate, a claim of priority is made to each of the above disclosed applications.

TECHNICAL FIELD

The present disclosure relates to optical fiber connections systems and to devices and methods for positioning an optical fiber within an alignment device.

BACKGROUND

Modern optical devices and optical communications systems widely use fiber optic cables. Optical fibers are strands of glass fiber processed so that light beams transmitted through the glass fiber are guided by the core of the fiber wherein a large fraction of the incident intensity of light directed into the fiber is received at the other end of the fiber.

Many approaches to achieve fiber alignment can be found in the prior art, among them are V-grooves and ferrules. Ferrule based alignment systems include ferruled connectors which use cylindrical plugs (referred to as ferrules) that fit within an alignment sleeve to perform fiber alignment. Precision holes are drilled or molded through the centers of the ferrules. Optical fibers are secured within the precision holes with polished ends of the optical fibers located at end faces of the ferrules. Precise fiber alignment depends on the accuracy of the central hole of each ferrule. Fiber alignment occurs when two ferrules are inserted into an alignment sleeve such that the end faces of the ferrules oppose one another and the optical fibers supported by the ferrules are co-axially aligned with one another.

V-grooves are commonly used in prior art ferrule-less fiber optic alignment devices. An example is the V-groove method described in U.S. Pat. No. 6,516,131 used for alignment of optical fiber ends. The V-groove is uni-directionally or bi-directionally tapered for enabling easy positioning of the fibers. In one example, two optical fibers desired to be optically connected together are positioned end-to-end within a V-groove such that the V-groove functions to co-axially align the optical fibers. End faces of the aligned optical fibers can abut one another.

When using ferrule-less optical fibers and connecting them by way of an alignment device with a V-groove, there can be some issues with energy loss due to the behavior of the fiber during the act of connection. Improvements are desirable.

SUMMARY

One aspect of the present disclosure relates to a method for positioning an optical fiber having an end portion within an alignment groove of an alignment device. The method includes orienting the optical fiber in the alignment groove of the alignment device; causing the optical fiber to elastically flex; using an interference point to assist in forming a curved profile of the flexed fiber, the interference point being at least 1.5 millimeters from a mid-plane of the alignment device; and using inherent elasticity of the flexed optical fiber to assist in retaining the end portion of the optical fiber in contact with the alignment groove.

In one aspect of the present disclosure, an optical connection system is provided. The optical connection system includes a fiber optic connector including a connector body having an interface and, the fiber optic connector also including an optical fiber that extends through the connector body, the optical fiber having a ferrule-less end portion that is accessible at the interface end of the connector body. The system further includes a fiber optic adapter including an adapter port for receiving the interface end of the connector body. The fiber optic adapter includes a fiber alignment groove for receiving the ferrule-less end portion of the optical fiber when the interface end of the connector body is inserted into the adapter port. At least one of the connector body and the adapter has an interference point at least 1.5 millimeters from a mid-plane of the adapter such that when the end portion of the optical fiber contacts the alignment groove and elastically flexes, the interference point assists in forming a curved profile of the flexed fiber, and the inherent elasticity of the flexed fiber assists in retaining the end portion of the optical fiber in contact with the alignment groove.

One aspect of the present disclosure relates to an optical connection system including a fiber optic connector with a connector body having an interface end and an optical fiber that extends through the connector body. The optical fiber has a ferrule-less end portion that is accessible at the interface end of the connector body. The connector body defines an interior fiber buckling region for allowing the optical fiber to buckle within the connector body when the fiber optic connector is connected to another fiber optic connector. The fiber optic connector further includes a pre-buckling protrusion that engages the optical fiber within the fiber buckling region causing the optical fiber to have a pre-buckled configuration prior to connecting the connector to the other connector.

The term "fiber" as used herein relates to an optical transmission element. Singlemode fibers include a core usually having a diameter of 8-12 µm and a cladding usually having a diameter of 120-130 µm, wherein the core is the central, light-transmitting region of the fiber, and the cladding is the material surrounding the core to form a guiding structure for light propagation within the core. The core and cladding can be coated with a primary coating usually comprising one or more organic or polymer layers surrounding the cladding to provide mechanical and environmental protection of the light-transmitting region. The primary coating may have a diameter ranging e.g. between 200 and 300 µm. The core, cladding and primary coating usually are coated with a secondary coating, a so-called "buffer", a protective polymer layer without optical properties applied over the primary coating. The buffer or secondary coating usually has a diameter ranging between 300-1100 µm, depending on the cable manufacturer. Multimode fibers typically have a larger core diameter than singlemode fibers. In some examples, multimode fibers can have a core with a graded index.

The term "light" as used herein relates to electromagnetic radiation, which comprises a part of the electromagnetic spectrum that is classified by wavelength into infrared, the visible region, and ultraviolet.

DETAILED DESCRIPTION

A. A First Connector System and Observed Areas for Improvement

Figure 1:
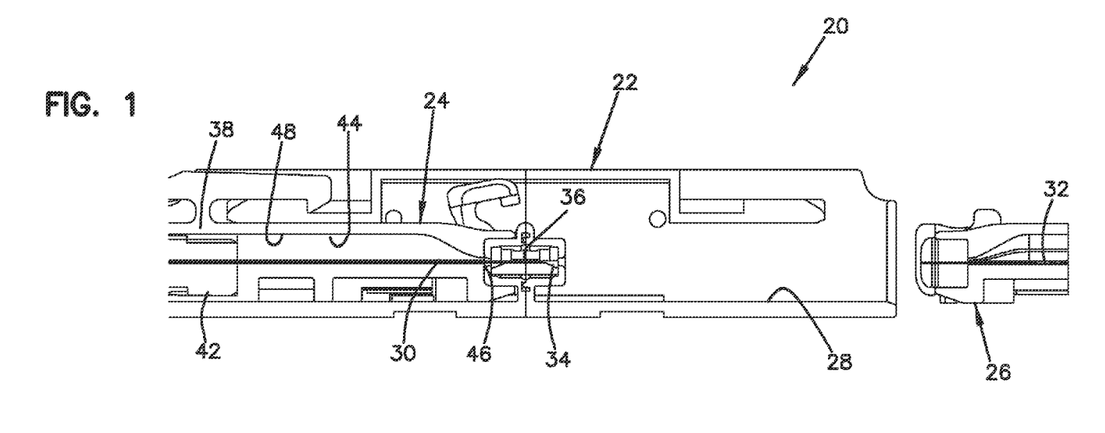
FIG. 1 is a schematic, side view of a first fiber optic connection system having an adapter with a first fiber optic connector loaded in the left port and connected to an alignment device, and a second fiber optic connector aligned with the right port.
Figure 2:
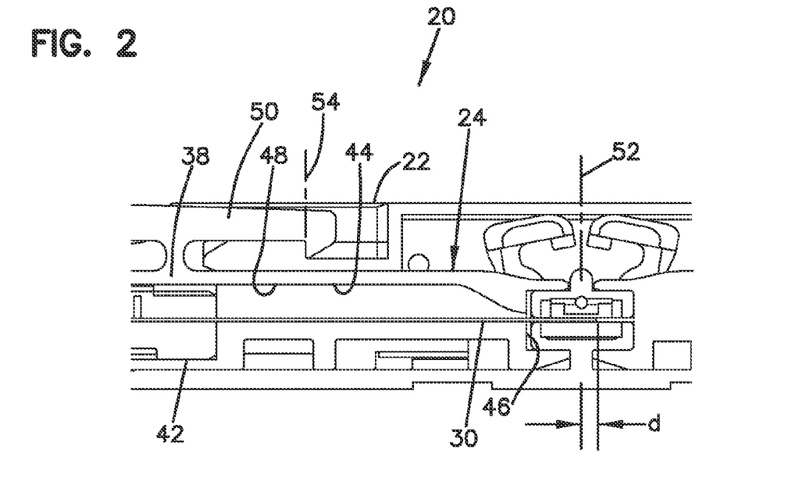
FIG. 2 is schematic, cross-section of the first fiber optic adapter of FIG. 1 and showing the right connector loaded into the right port; the right connector being illustrated without a fiber for purposes of clarity of illustration.
Figure 3:
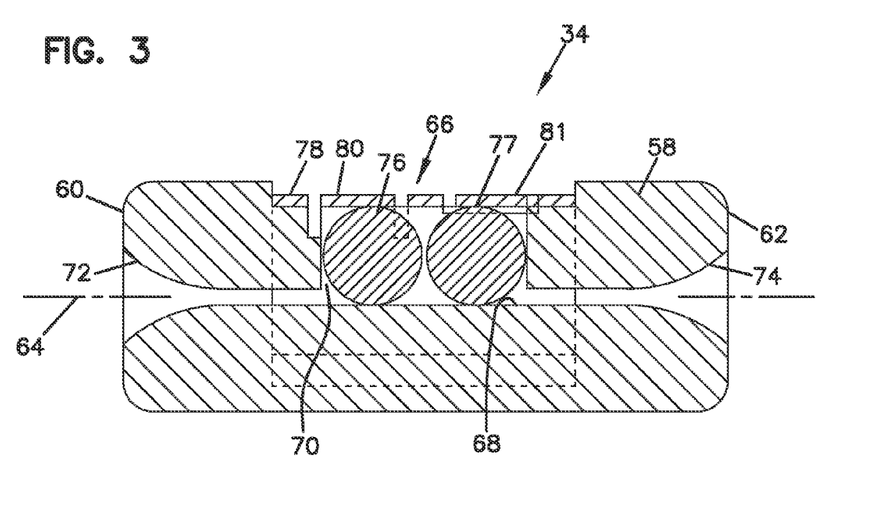
FIG. 3 is a schematic cross-sectional view depicting an alignment device usable in the connection system of FIGS. 1 and 2.

FIGS. 1-3 show a first optical connection system 20. In FIG. 1, a fiber optic adapter 22 is adapted for receiving and optically connecting two fiber optic connectors, illustrated in FIG. 1 as left connector 24 and right connector 26. When the fiber optic connectors 24, 26 are inserted within coaxially aligned ports 28 of the fiber optic adapter 22, optical fibers 30, 32 of the connectors 24, 26 enter an optical fiber alignment device 34 and are mechanically aligned at a fiber alignment region 36 so that an optical coupling is provided between the ends of the fibers 30, 32.

Each of the optical connectors 24, 26 includes a connector body 38. The connector body 38 holds a fiber fixation assembly 42 and defines next to it an open volume 44. The fiber fixation assembly 42 functions to anchor or secure the optical fibers within the connectors 24, 26. The fiber 30 extends from the fiber fixation assembly 42 through the open volume 44 and out at an interface end 46.

Within the open volume 44 is a buckling cavity 48, to provide volume to allow for the fiber 30 to curve or buckle when the opposing fiber 32 is pushed against it to connect the two fibers 30, 32.

In FIG. 2, the connector system 20 of FIG. 1 is depicted, and shows the right connector 26 operably engaged within the port 28. In FIG. 2, a mid-plane of the adapter 22 is shown at 52. The mid-plane 52 is the plane that contains the geometric center of the adapter 22, centered between opposite ends that receive the connectors 24, 26. The mid-plane 52 is also the plane that contains the geometric center of the alignment device 34 between opposite ends 60, 62 (FIG. 3). The fiber 30 must protrude beyond the mid-plane 52 when latch 50 and adapter 22 meet at the mechanical reference plane 54. In FIG. 2, the right connector 26 is illustrated without a fiber for purposes of clarity of illustration of distance d.

In reference now to FIG. 3, a close-up cross-section of the alignment device 34 is depicted. The alignment device 34 includes an alignment housing 58 made from, for example, a molded plastic. It could also be made from molded ceramic or using metal injection molding. The housing 58 includes first and second opposite ends 60, 62. The alignment housing 58 defines a fiber insertion axis 64 that extends through the alignment housing 34 between the first and second ends 60, 62. A fiber alignment region 66 is at an intermediate location between the first and second ends 60, 62. The fiber alignment region 66 includes an alignment groove 68 that extends along the fiber insertion axis 64. In some arrangements, the groove 68 can be formed by a pair of rods in the housing 58. The alignment housing 58 also defines at least one pocket 70, which can include two individual pockets in some embodiments, at the fiber alignment region 66 adjacent to the alignment groove 68. The first end 60 of the alignment housing 58 includes a first funnel 72 that extends along the fiber insertion axis 64 for guiding the first optical fiber 30 into the fiber alignment region 66. The second end 62 of the alignment housing 58 includes a second funnel 74 that extends along the fiber insertion axis 64 for guiding the second optical fiber 32 (FIG. 1) into the fiber alignment region 66. The first and second funnels 72, 74 are configured to taper inwardly toward the fiber insertion axis 64 as the first and second funnels 72, 74 extend into the alignment housing 58 toward the fiber alignment region 66. The tapered configuration of the funnels 72, 74 functions to guide the first and second optical fibers 30, 32 into coaxial alignment with the fiber insertion axis 64 such that the optical fibers 30, 32 can be easily slid into registration with the alignment groove 68.

The alignment device 34 further includes structure for urging the optical fibers 30, 32 into contact with the fiber alignment groove 68. In the depicted embodiment, the alignment device 34 includes first and second spheres 76, 77 positioned within the at least one pocket 70. In embodiments with two pockets, there is one sphere 76, 77 in each individual pocket. The pocket 70 has a direction that extends along the fiber insertion axis 64, and the pocket 70 functions to align the spheres 76, 77 along the fiber insertion axis 64. A clip 78, in the form of a metal clip having elastic properties, is mounted over the housing 58 to urge the spheres 76, 77 in a direction transverse with respect to the fiber insertion axis 64. When the clip 78 is put over the housing 58, the clip 78 functions to capture the spheres 76, 77 within the pocket 70. The clip 78 can include springs 80, 81 for respectively biasing the spheres 76, 77 toward the alignment groove 68.

When the opposing fibers 30, 32 mate (i.e., abut) within the alignment groove 68, the mating interface is typically not at the mid-plane 52 of the adapter 22.

It has been learned that the performance of the connector system 20 is dependent on the distances that the fibers 30, 32 (FIG. 1) protrude beyond the mid-plane 52 of the adapter 22. The distance d is illustrated in FIG. 2. The minimum value of d should be greater than zero to maintain good optical performance. If d is too large, one or both of the fibers 30, 32 may buckle excessively, causing bending stresses to increase.

B. Observations for Improved Connector System

Given some of the disadvantages of the first connection system, several observations for an improved connection system are made. Included in these observations are that interference of the fiber with one or more features can be used to flatten the fibers into the alignment groove 68 when buckling occurs. The buckling forces are oriented relative to the plane of the buckle. The orientation of the mechanical system leads to several other concepts. Among those are that the buckling cavity 48 can be used to orient the buckled fiber relative to the alignment groove 68. In some systems, a feature can be added to break the symmetry and "pre-buckle" the fiber in the desired direction. This "pre-buckle" feature has the added benefit of removing an initial shock as the two straight fibers come together in an unstable equilibrium with a high mating force and then buckle. A "pre-buckled fiber" may have advantages if it is about the same length as an unbuckled fiber.

C. Concepts Illustrated Graphically in FIGS. 4-8

FIGS. 4-8 schematically depict the concept of introducing an interference point for the fiber at a location to result in advantages. When the interference point is properly located, the location will influence the shape of the fiber when it buckles, so that the buckled fiber is not so sharp that it introduces stresses into the fiber, resulting in long term reliability/performance issues.

An interference point is represented graphically in FIGS. 4-8 at 84. A fiber optic fiber is shown schematically at 86. The graphs of FIGS. 4-8 schematically show the position of fiber 86 as it moves over time from being in a relatively flat state, prior to engaging an opposing fiber for connection, to a final, fully connected state. For purposes of illustration to convey understanding, the "interference point" is shown as a sharp corner, such that the fiber 86 touches at only one point, but it should be understood that the interference "point" will be rounded, and the fiber 86 will make contact over a length of limited extent.

Figure 4:
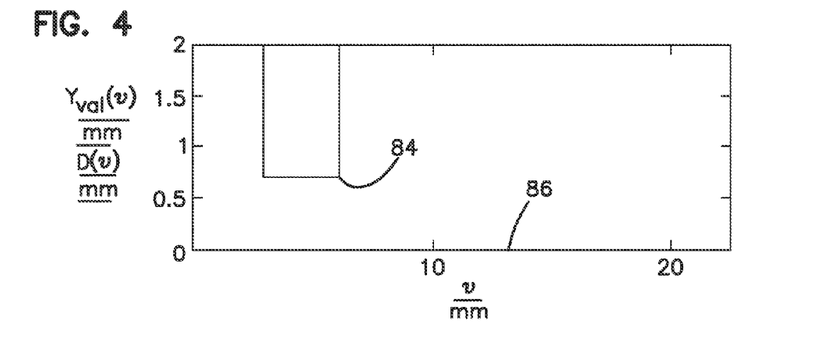
FIGS. 4-8 are graphs schematically showing the curved profile of a flexed fiber during the connection process, in accordance with principles of this disclosure.
Figure 5:
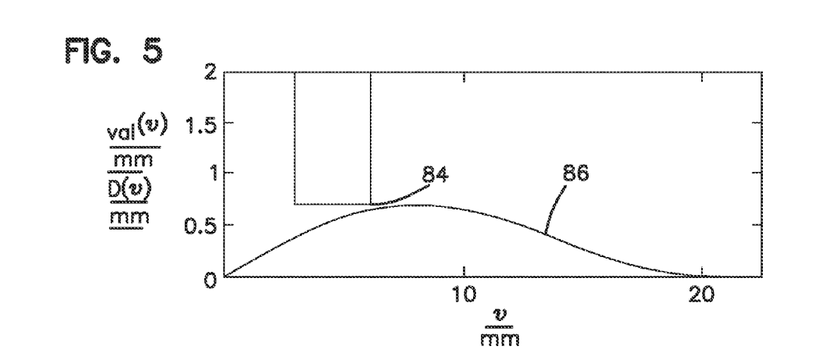

In FIG. 4, the fiber 86 is flat, unflexed, and is depicted as lying on top of the x-axis of the graph. In FIG. 5, an opposing fiber has abutted the end of the fiber 86 in a connection system, and the fiber 86 starts to buckle. In FIG. 5, the fiber 86 is shown flexed and moving through a curve.

Figure 6:
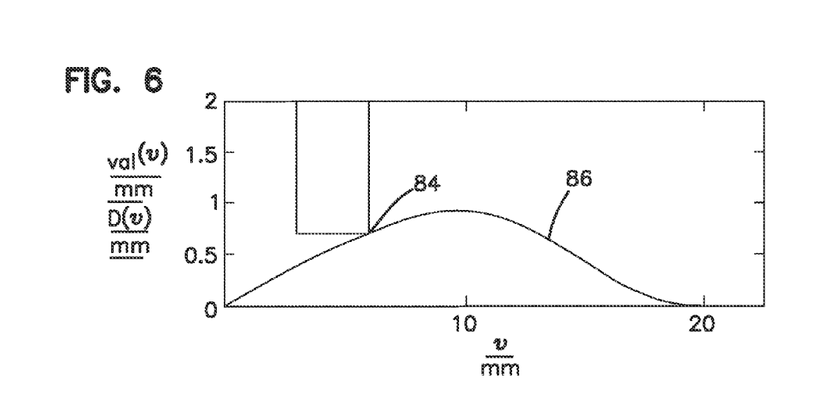

In FIG. 6, the flexed fiber 86 has just come into contact with the interference point 84. Engagement between the interference point 84 and the fiber 86 can be seen.

Figure 7:
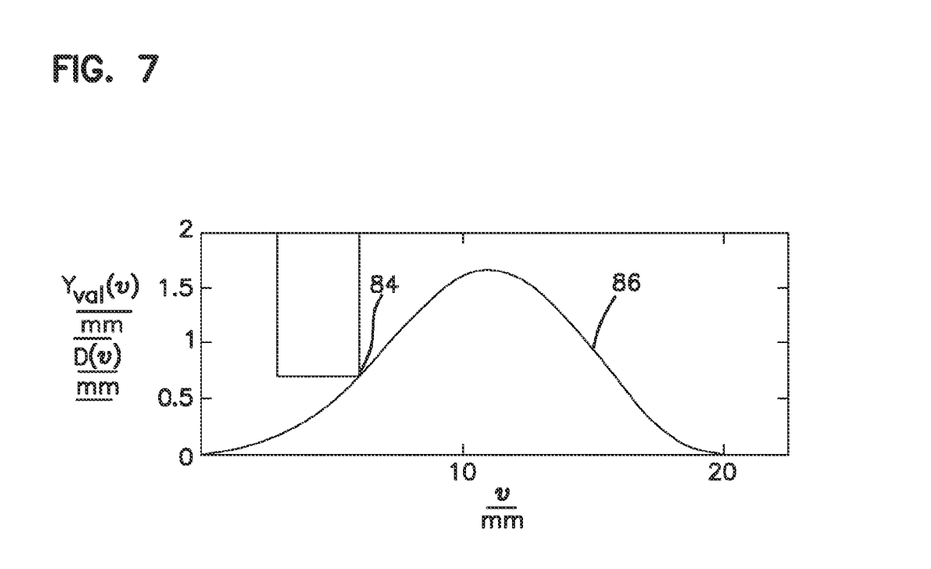

In FIG. 7, the fiber 86 continues to flex, as the curved profile that the fiber 86 takes becomes sharper. The interference point 84 influences or assists the shape of the profile of the fiber curve formed.

Figure 8:
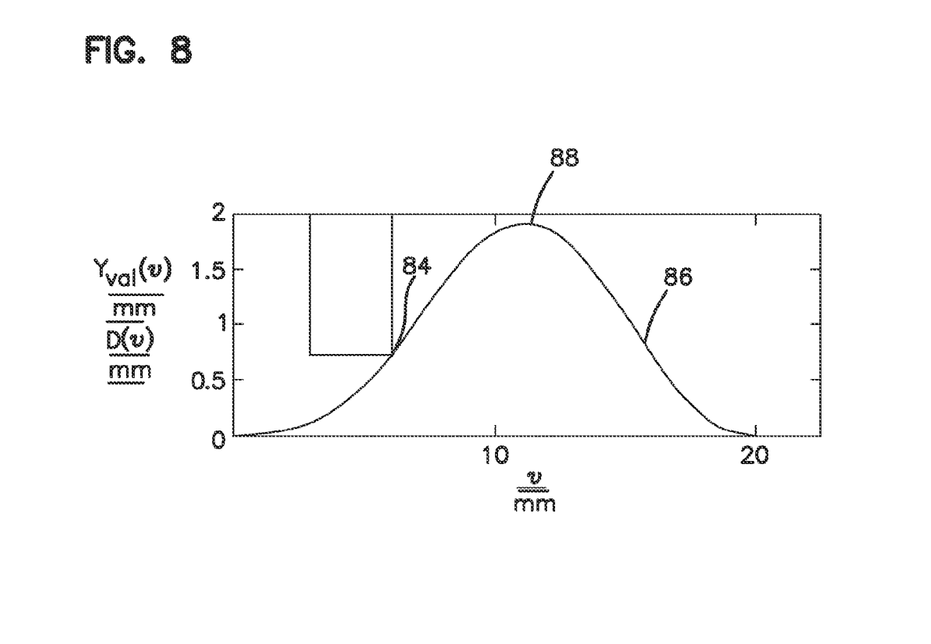

FIG. 8 illustrates a final disposition of the fiber 86. The curved profile of the fiber 86 forms a smooth peak at 88. The curved profile of the flexed fiber 86 is at its sharpest at this point, but the connection is complete, and the fiber 86 does not further flex.

From a review of FIGS. 4-8, it can be appreciated that the location of the interference point 84 laterally relative to the fiber 86 will influence the shape that the flexed fiber 86 forms. It should be noted that FIGS. 4-8 depict the shape of the fiber 86 in the absence of any force applied by the spheres 76, 77; the force which flattens the left end of the fiber 86 into the alignment groove 68 is due to the force applied to the right end of the fiber 86 and contact with the interference point 84 as the fiber 86 buckles.

If there is a limited space in which the curved fiber 86 can flex, then moving the interference point 84 too far to the right will cause the fiber 86 to be constrained to a curved profile that is too sharp. As previously mentioned, if the curved profile is too sharp, this introduces bending stresses into the fiber 86 and negatively affects reliability and/or performance, which may include an increased insertion loss. On the other hand, if the interference point 84 is too far to the left (that is, too close to the point of engagement with the opposite fiber), then the fiber will not assume the profile shown in FIG. 8 in which the left end of the fiber is in contact with the v-groove; rather, the profile will remain as shown in FIGS. 5 and 6, where the fiber is at an angle relative to the v-groove, with the result that the insertion loss is high.

In incorporating the interference point concept into the optical connector system, it should be appreciated that the interference point 84 can be a structural part that is part of the connector housing, or part of the alignment housing, or part of the adapter housing. In general, it has been found to result in advantages if the interference point is at least 1.5 millimeters from a mid-plane of the alignment device when the connector is fully loaded in its corresponding port.

D. Example Embodiments of FIGS. 9-19

Figure 9:
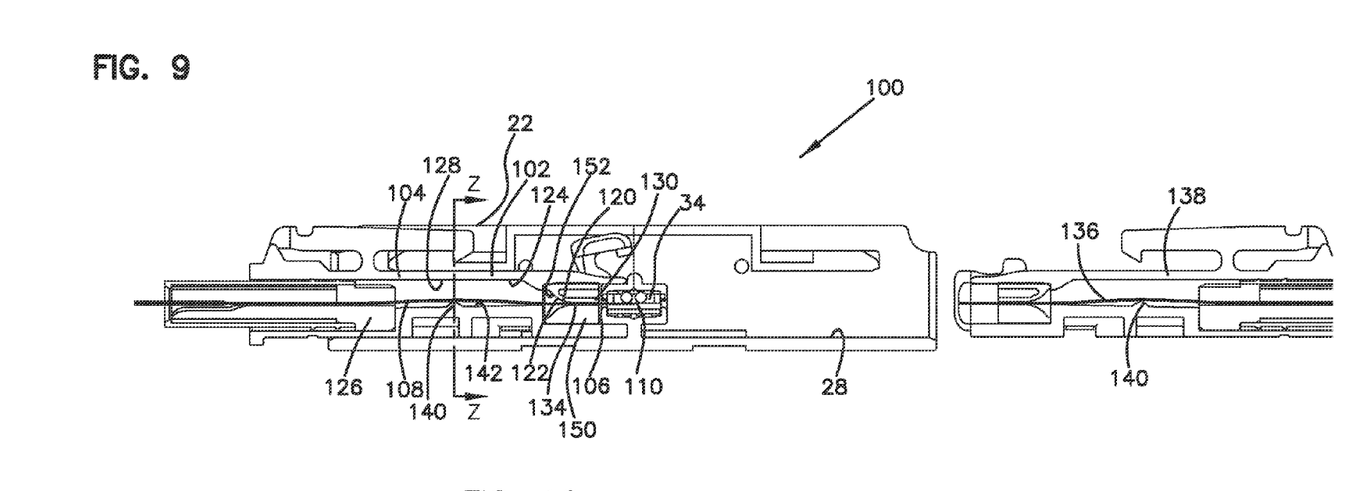
FIG. 9 is a schematic, cross-sectional view of an optical connection system, in an unmated state, designed in accordance with principles of this disclosure.
Figure 10:
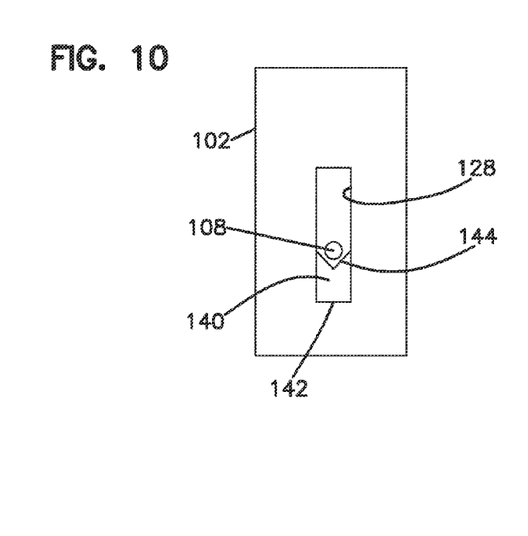
FIG. 10 is a schematic view of one portion of the system of FIG. 9, the cross-section being taken along the line Z-Z of FIG. 9.

FIGS. 9-19 illustrate an example embodiment of an optical connector system 100 with improvements in accordance with the principles of this disclosure. In FIGS. 9 and 10, the optical connector system 100 includes some features that were described in connection with FIGS. 1-3, and will carry the same reference numerals for like parts.

The connector system 100 includes a fiber optic connector 102 including a connector body 104 having an interface end 106. An optical fiber 108 extends through the connector body 104. The optical fiber 108 has a ferrule-less end tip or end portion 110 that is accessible at the interface end 106 of the connector body. The connector 102 is shown operably disposed within adapter 22. The adapter 22 includes adapter port 28 for receiving the interface end 106 of the connector body 104.

The system 100 includes an interference point 120 to assist in forming a curved profile of the flexed fiber 108. The interference point 120 can be part of the adapter 22, the alignment device 34, or the connector body 104. It should be understood that the interference point 120 can be rounded, including a radius, such that the fiber 108 will be in contact with it over an extension of points.

In general, advantages result when the interference point 120 is positioned to be at least 1.5 millimeters from a mid-plane of the alignment device 34 when the connector 102 is fully inserted in its corresponding adapter port. When the interference point 120 is advantageously positioned, when the end portion 110 of the optical fiber 108 contacts the alignment groove 68 (FIG. 3) and elastically flexes, the interference point 120 assists in forming a curved profile of the flexed fiber. This also results in being able to use the inherent elasticity of the flexed optical fiber 108 to assist in retaining the end portion 110 of the fiber 108 in contact with the alignment groove 68. The contact can include an aligned contact, in which the fiber 108 is generally in alignment with the groove 68.

In some arrangements, advantages are achieved when the interference point is at least 4 millimeters from the tip or end portion 110 of the fiber 108 when the connector 102 is fully inserted in its corresponding adapter port. Advantages result further when the interference point is no greater than 8 millimeters from the tip or end portion 110 of the fiber.

In the example embodiment shown in FIGS. 9 and 10, the interference point is shown at 120. The interference point 120 can include a structure, such as a rounded corner, 122 extending or projecting into an internal cavity 124 of the connector body 104. The internal cavity 124 accommodates the fiber 108 as it extends from fiber fixation assembly 126 to the interface end 106. In some embodiments, the structure 122 will extend downwardly from an internal wall forming the cavity 124.

In some embodiments, the interference point 120 can be an integral portion of the connector body 104. In other embodiments, such as the one shown in FIGS. 9 and 11, the interference point 120 is part of a nose piece 150. The nose piece 150 can be separable, in that it can be manufactured, such as by molding, separately from the rest of the connector body 104, and then assembled into the rest of the connector body 104. The nose piece 150 can be, for example, snapped in place during assembly of the connector 102. In the example shown, the nose piece 150 has a constriction or funnel surface 152 that is symmetric about the fiber 108. In practice, after assembly of the nose piece 150 in the connector body 104, the portion of the funnel surface 152 that extends in a downward direction from the wall forming cavity 124 will function as the interference point 120.

Figure 13:
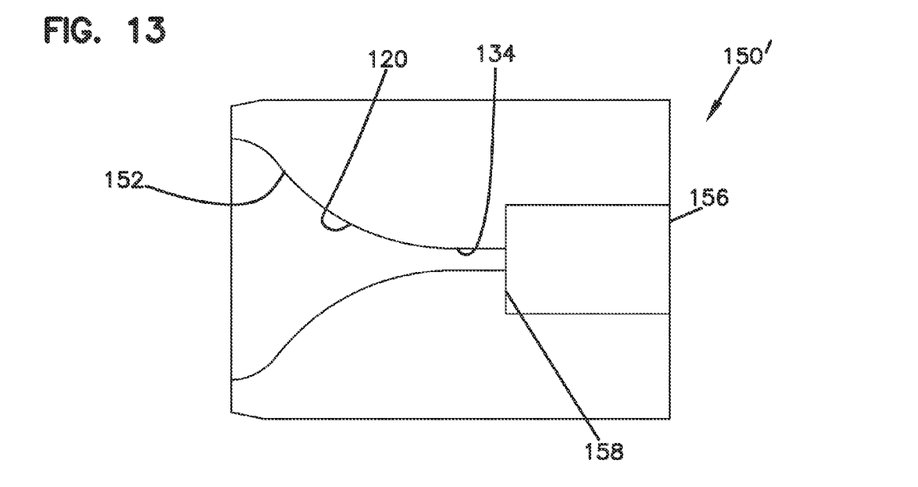
FIG. 13 is a schematic side view of an alternative embodiment of a nose piece that can be used with the system of FIG. 9.

FIG. 13 shows a schematic, side view of an alternate embodiment of nose piece 150'. Nose piece 150' is analogous to nose piece 150, including having the constriction or funnel surface 152 that is symmetric about the fiber 108 and the exit cavity 134. Nose piece 150' differs from nose piece 150 in that nose piece 150' includes a front surface 156 having a counterbore 158. The counterbore 158 facilitates manufacturing by limiting the length of the narrow portion of the exit cavity 134. Because it can sometimes be difficult or expensive to mold long, slender features, the counterbore 158 helps to address this problem by limiting the length of the exit cavity 134. The position of the interference point 120 does not change.

Figure 11:
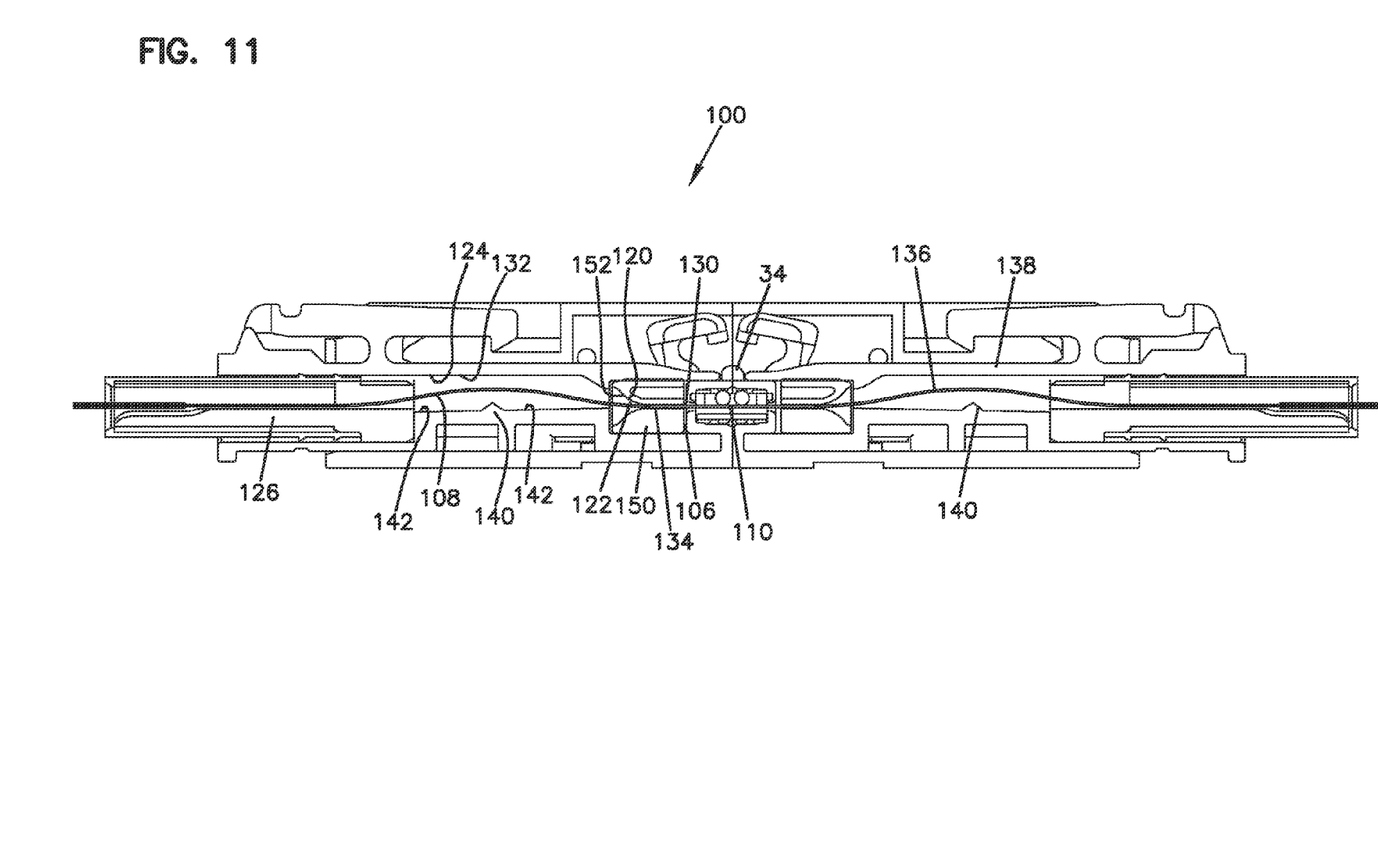
FIG. 11 is the connection system of FIG. 9 after the fibers are in a mated state.

In the example embodiment shown in FIGS. 9 and 11, the interference point 120 is at least one millimeter from the interface end 106 of the connector body 104. In the example shown in FIGS. 9 and 11, the interference point 120 is no greater than 6 millimeters from the interface end 106 of the connector body 104.

The internal cavity 124 of the connector body 104 includes a buckling cavity 128 for accommodating the curved profile formed by a buckled fiber, when mated. The internal cavity 124 also includes an exit cavity 134. The exit cavity 134 has a passage, which can be generally circular to have a diameter that is smaller than a dimension between floor and ceiling of the buckling cavity 128. The buckling cavity 128 can be generally racetrack shaped in cross-section, but other shapes are possible. The exit cavity 134 is defined by opposite ends, with one end being at the exit hole 130 at the interface end 106, and the opposite end being at the interference point 120. The exit cavity 134 can be an integral part of the connector body 104, or as shown in FIGS. 9 and 11, it can be part of the nose piece 150. In general, advantages result and a desired curved profile for the fiber will result when the diameter of the exit cavity 134 is at least 10 μm larger than the diameter of the fiber 108 and not greater than 300 μm larger than the diameter of the fiber 108. In some systems, the diameter of the exit cavity 134 will be in a range of about 70-80, such as 75, μm larger than the diameter of the fiber 108. In some examples, the diameter of the exit hole 130 will be about 0.2 mm. The nose piece 150 can more easily be manufactured to include this sized exit hole 130 when pre-made, separate from the rest of the connector body 104, than in systems that do not use a separate nose piece 150.

FIG. 9 illustrates the connector 102 in an unmated state, while FIG. 11 shows the connector 102 in a mated, or connected state. In the mated state, the fiber 108 in the connector 102 is connected to a fiber 136 in a mating connector 138. In the mated state, one or both of the fibers 108, 136 will buckle. If the amplitude of the buckle is small, or if one of the fibers 108, 136 does not buckle, the spheres 76, 77 (FIG. 2) and spring forces in the clip 78 (FIG. 2) in the alignment device 34 will force the fibers 108, 136 into the alignment groove 68. If the amplitude of the buckle is large, as shown in FIG. 11, the engagement with the interference point 120 produces a downward force which flattens the tip or end portion 110 of the fiber 108 against the alignment groove 68. The flexed optical fiber 108 has inherent elasticity that assists in retaining the end portion 110 against the alignment groove 68.

In some example uses, as the fiber 108 is inserted in the alignment device 34, before the fiber 108 buckles, the spheres 76, 77 and springs 80, 81 provide initial axial alignment of the mating fibers 108. In some uses, springs 80, 81 are not used.

Figure 14:
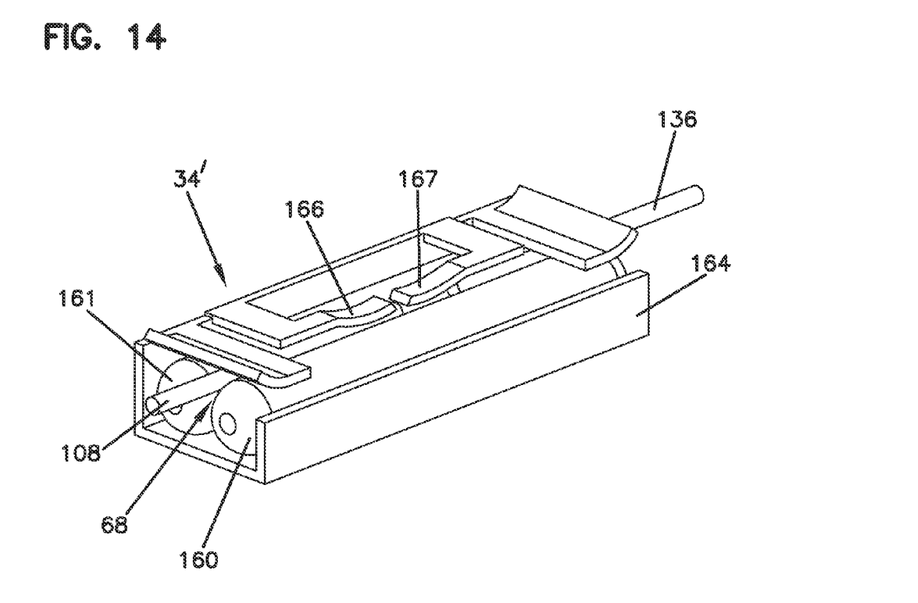
FIG. 14 is a perspective view of an embodiment of an alignment device including the interference point within the alignment device.
Figure 15:
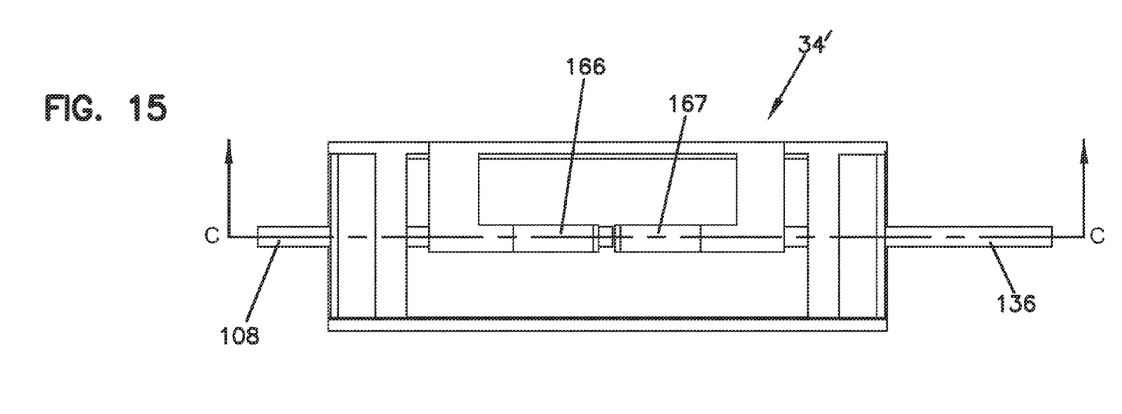
FIG. 15 is a top view of the alignment device of FIG. 14.
Figure 16:
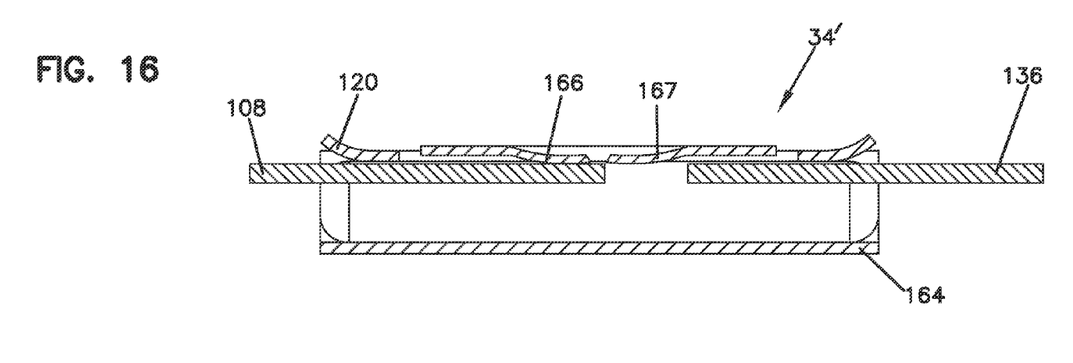
FIG. 16 is a cross-sectional view of the alignment device of FIGS. 14 and 15, the cross-section being taking along the line C-C of FIG. 15.

Attention is directed to FIGS. 14-16 depicting an alternate embodiment of an alignment device 34'. In this embodiment, the interference point 120 is within the alignment device 34' (see FIG. 16). The alignment groove 68 is formed by two cylindrical rods 160, 161 whose axes are nominally parallel. In this particular embodiment, the rods 160, 161 touch each other. The housing 164 for the alignment device 34' is shown as a part that may be stamped and formed. The interference point 120 is part of this housing 164. Spring fingers 166, 167 are likewise part of the housing. Note that in this design there are no spheres 76, 77. Rather, the spring fingers 166, 167 are curved and make contact with the fibers 108, 136 directly.

In some embodiments, there can be optional structure included to cause the optical fiber to have a pre-buckled configuration prior to connecting the connector to the other connector. The pre-buckling structure provides an advantage by removing an initial shock as two straight fibers come together in an unstable equilibrium with a high mating force, and then buckle. In systems that include this optional feature, the pre-buckling structure can be in the form of a pre-buckling protrusion 140. The protrusion 140 will be positioned to engage the optical fiber to cause it to have a pre-buckled configuration prior to connecting the connector to the other connector.

In the example shown in FIGS. 9 and 10, the pre-buckling protrusion 140 is located within the buckling cavity 128. Many different embodiments are possible, and in the example shown in the cross-section of FIG. 10, the protrusion 140 extends or protrudes from a bottom wall 142 of the buckling cavity 128 and defines a cradle 144 (FIG. 10) for holding the fiber 108. The cradle 144 can be in the form of a V-shaped groove or cross-section, as can be seen in the example of FIG. 10. The cradle 144 can be other cross-sectional shapes, as well, such as U-shaped. In the example shown, the interference point 120 is spaced a distance from the pre-buckling protrusion 140. Specifically, the interference point 120 is spaced between the protrusion 140 and the exit hole 130. The pre-buckling protrusion 140 is spaced between the fiber fixation assembly 126 and the interference point 120. In some examples, the pre-buckling protrusion 140 is placed at the approximate location of the peak 88 (FIG. 8) of the buckle. In the example shown, the protrusion 140 extends from the bottom wall 142, while the interference point 120 projects from the top wall 132, such that the interference point 120 extends in a direction opposite of the direction of the protrusion 140. The separate nose piece 150 allows for easier manufacturing (e.g., molding) of the protrusion 140 in the connector body 104, than in embodiments that do not have a separate nose piece 150.

As can be seen in FIG. 9, in the unmated state, in embodiments that use a pre-buckling protrusion 140, the optical fiber 108 descends downward from the protrusion 140 as it extends towards the interface end 106 of the connector body. This allows the fiber 108 to be oriented in the alignment groove 68 at an angle relative to the alignment groove 68. For example, the fiber 108 will be oriented from a height higher than an entry slot into the alignment groove 68. This angle of entry helps so that when the fiber 108 is flexed during the mating process, interference with the interference point 120 results in a downward force, and the inherent elasticity of the flexed optical fiber 108 assists in retaining the end portion 110 in aligned contact with the alignment groove 68.

There are alternate ways to break the symmetry and cause the fiber 108 to pre-buckle. For example, the fiber fixation assembly 126 can be laterally offset, in an upward vertical direction relative to the rest of the connector 102. Alternatively, the fiber fixation assembly 126 can be angled up, relative to the rest of the connector 102, so that the fiber 108 strikes the interference point 120, in the absence of contact between the fiber 108 and any other element in the system 100.

Figure 17:
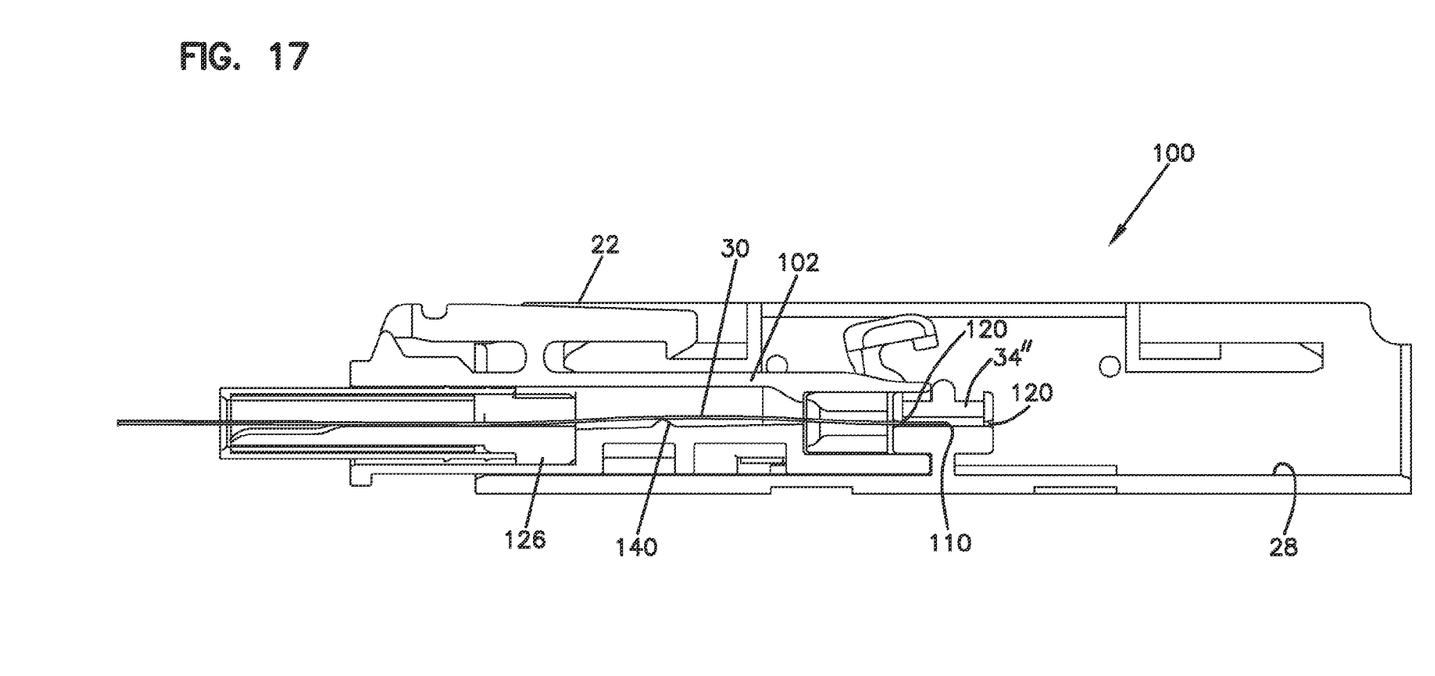
FIG. 17 is a schematic, cross-sectional view of an optical connection system, in an unmated state, showing another embodiment of an alignment device, designed in accordance with principles of this disclosure.
Figure 18:
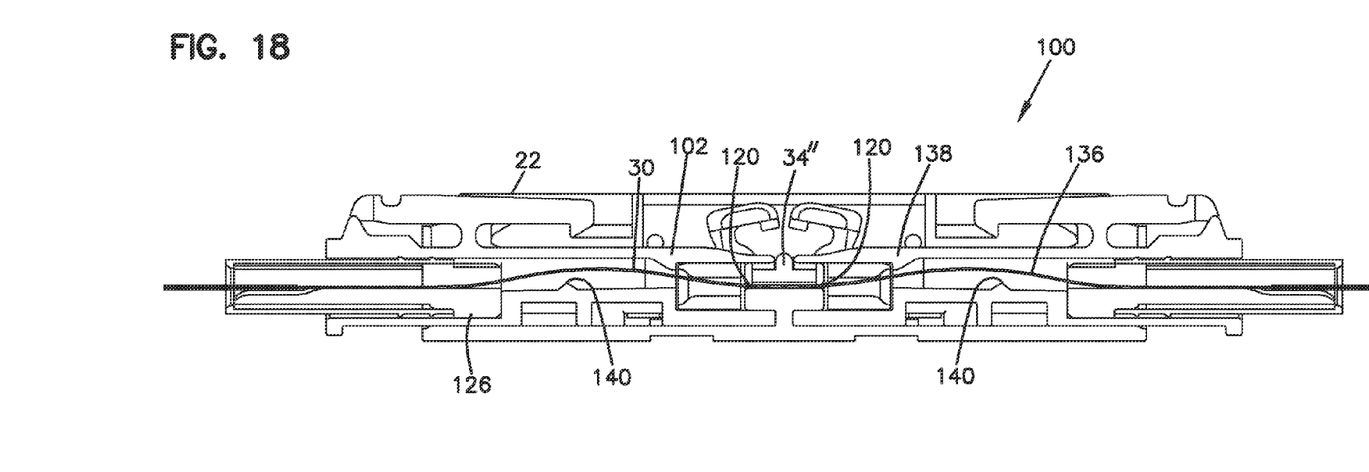
FIG. 18 is the connection system of FIG. 17 after the fibers are in a mated state.
Figure 19:
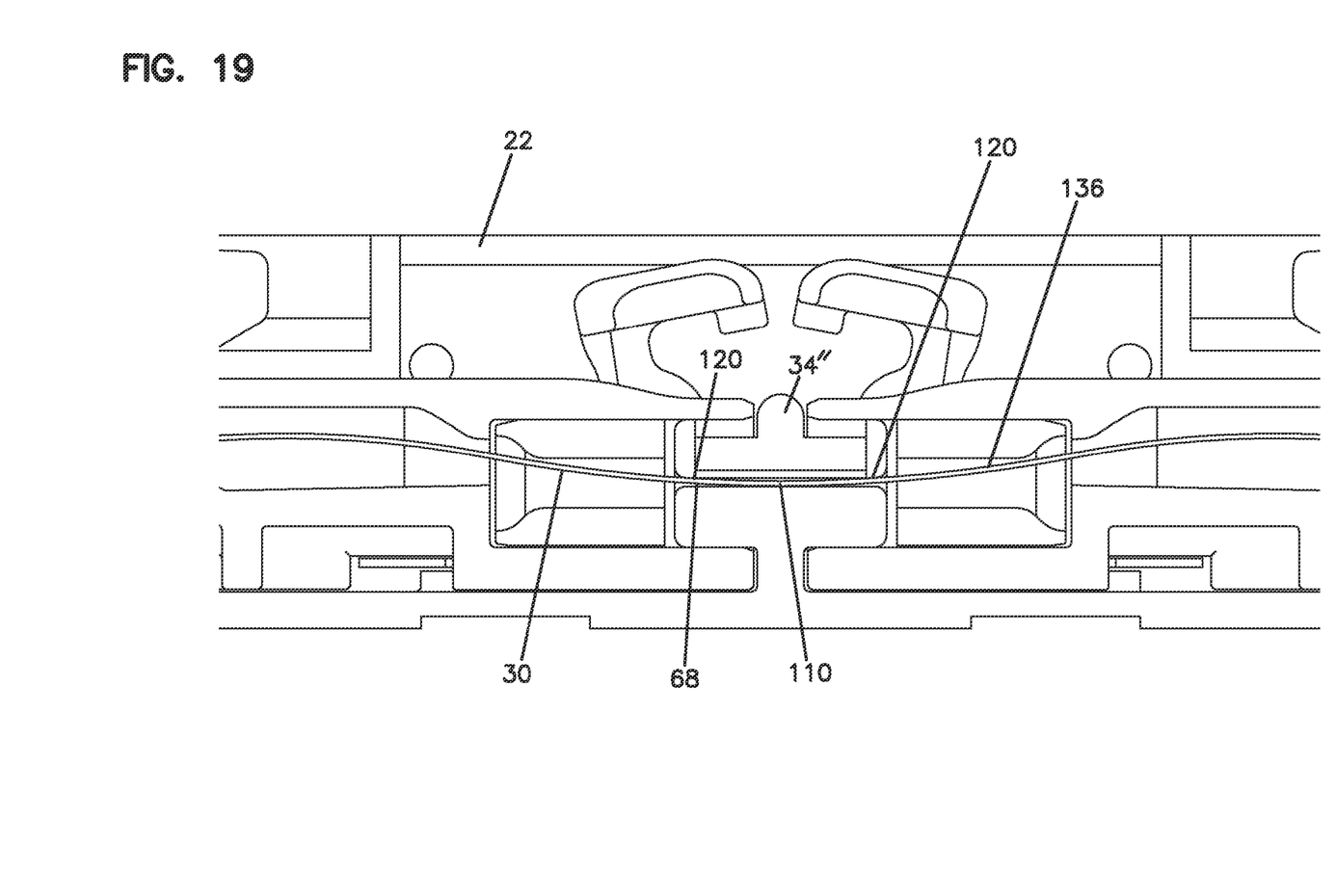
FIG. 19 is enlarged view of the mated fibers in the connection system of FIG. 18.

In FIGS. 17-19, the system 100 includes interference point 120 as part of the alignment device 34". The alignment device 34" uses the force of the pre-buckled fiber 30, which has been pre-buckled by the pre-buckling protrusion 140, to align the fiber 30 in the alignment groove 68 of the alignment device 34". The interference point 120 causes the end 110 of the pre-buckled fiber 30 to be angled down into the groove 68 of the alignment device 34". In this embodiment, the interference point 120 is at least 1.5 mm from a mid-plane of the alignment device 34".

In the embodiment of FIGS. 17-19, the alignment device 34" is molded as an integral part of the adapter 22. The alignment device 34" has no springs or spheres, in preferred implementations.

In FIG. 18, the fibers 30, 136 meet in the alignment device 34". An enlarged view of the mating fibers is shown in FIG. 19. In the example illustrated, both fibers 30, 136 buckle, and both fibers 30, 136 touch the interference point 120 in their respective connector 102, 138.

From description of the above example embodiments, methods for use can be realized. For example, a method for positioning the optical fiber 108 into the alignment groove 68 of the alignment device 34 includes orienting the optical fiber 108 in the groove 68. Next, the optical fiber 108 is caused to be elastically flexed. For example, this step happens as a result of the mating of the connector 102 with the opposite connector 138, in which opposing fibers 108, 136 engage. Next, there is a step of using interference point 120 to assist in forming a curved profile of the flexed fiber 108. The interference point 120 will be at least 1.5 millimeters from a mid-plane of the alignment device 34. Next, the inherent elasticity of the flexed optical fiber 108 is used to assist in retaining the end portion 110 of the fiber 108 in aligned contact with the alignment groove 68.

Figure 12:
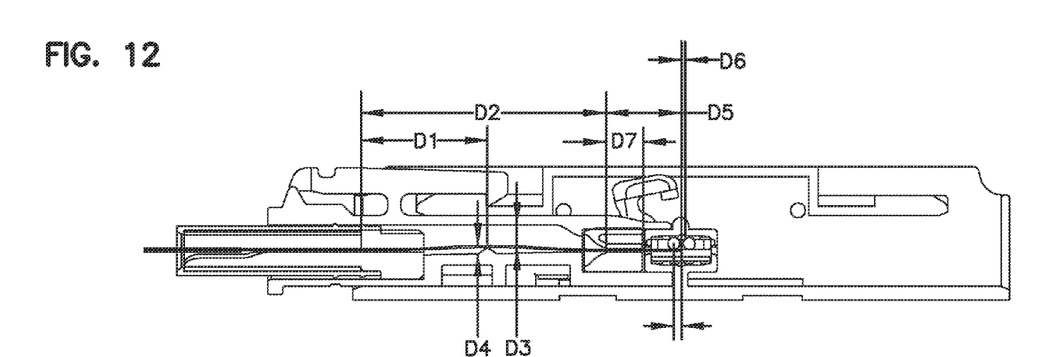
FIG. 12 is a schematic, cross-sectional view of an optical connection system, showing one of the connectors in an unmated state, and with example dimension lines.

FIG. 12 illustrates the connector 102 with dimension lines, to show some example, useable dimensions. It should be understood that these are useable examples only, and that all of these distances scale with the size of the connector. Of course, there can be variations in these dimensions.

D1 is the distance from the fiber fixation assembly 126 to the pre-buckling protrusion 140 and is about 8-10 mm. D2 is the distance from the fiber fixation assembly 126 to the interference point 120 and is about 16-19 mm, preferably about 17.8 mm. The distance, D7, between the interference point 120 and the interface end 106 is between 1 mm-4 mm, preferably 2 mm. Losses start to increase beyond 4 mm, but may be acceptable.

D3 is the height of the buckling cavity 128 and is 1.9 mm.

D4 is the height of the protrusion 140 and can be in the range of 0.1-0.5 mm. Values below 0.1 may also work. Values above 0.5 mm will work, but reduce the difference between the pre-buckled and buckled states.

The distance D5 from the interference point 120 to the midplane 52 (FIG. 2) is 3.75-6.75 mm. D5 can be at least 3 mm. D5 can be no greater than 7 mm. In some embodiments, depending upon the application and desired objectives, advantages can be achieved when D5 is at least 4 mm; at least 4.5 mm; at least 5 mm; at least 5.5 mm; at least 6.0 mm; or at least 6.5 mm. The distance D6 from the midplane 52 to the end portion 110 of the fiber 108 is nominally 0.15 mm, but may be as little as 0.05 mm and as large as 0.5 mm.

The diameter DH of the fiber exit hole 130 is 0.2 to 0.4 mm. The diameter DF of the fiber is 0.125 mm in the current design, which should also accommodate a reduced diameter fiber, such as 0.080 mm or a coated fiber, such as 0.250. The diametric clearance DH−DF between the fiber exit hole and the fiber could probably be as small as 0.015 mm or as large as 0.275 or even larger.

D8 is the distance from the center of a sphere 76 or 77 to the midplane 52 is nominally 0.5-1 mm.

Further observations of the described system include:

The buckled fiber behaves approximately as a column which is fixed at both ends (i.e. both ends are coaxial with the unbuckled fiber), where one end of the column is the fiber fixation assembly 126 and the other end is the interference point 120. The effective length of the buckled column is D2. The amplitude of the axis of the buckled fiber at which the fiber touches the buckling cavity 48 is D3−DF. The compression of the buckled column is D6. The following ratios are helpful:

D6/D2=0.003 to 0.030

(D3−DF)/D2=0.09 to 0.11

When the buckled fiber first touches the interference point 120, the section of the fiber from the point of contact with the mating fiber to the interference point 120 is approximately linear, as shown in FIG. 6. The slope of this section of the fiber is given approximately by the following ratio:

(DH−DF)/D5=0.002 to 0.073

The fiber is guided by the fiber exit hole for a distance D7, which is a fraction of the total length D5 between the fiber interference point 120 and the midplane 52:

D7/D5=0.26 to 0.59

The spheres 76 and 77 provide a force to the fiber which forces it into the v-groove. The relationship between this force and the force provided by the buckled fiber due to the interference point 120 is affected by the following ratio:

D8/D5=0.07 to 0.27

The pre-buckling protrusion 140 is located at the approximate midpoint of the buckled column, and is relatively small relative to the height of the cavity:

D1/D2=0.4 to 0.6
D4/(D3−DF)=0.05 to 0.18

The above represents example principles and embodiments. Many embodiments can be made applying these principles.

What is claimed is:

1. A method for positioning an optical fiber having an end portion within an alignment groove of an alignment device, the method comprising:
    orienting the optical fiber in the alignment groove of the alignment device, the optical fiber being oriented within a fiber optic connector body, the connector body having an interface end through which the optical fiber extends and an internal cavity accommodating the optical fiber, the internal cavity including a buckling cavity and an exit cavity with a diameter smaller than the dimension of the buckling cavity, the exit cavity having first and second opposite ends;
    causing the optical fiber to elastically flex;
    using an interference point projecting into the connector body internal cavity to assist in forming a curved profile of the flexed fiber, the interference point being at least 1.5 mm from a mid-plane of the alignment device, wherein the exit cavity second end is at the interference point, and the exit cavity first end is at the interface end; and
    using inherent elasticity of the flexed optical fiber to assist in retaining the end portion of the optical fiber in contact with the alignment groove.

2. The method of claim 1 wherein the step of using an interference point includes using an interference point at least 3 mm from the mid-plane of the alignment device.

3. The method of claim 1 wherein the step of using an interference point includes using an interference point no greater than 7 mm from the mid-plane of the alignment device.

4. The method of claim 1 wherein the step of using an interference point in the connector body includes using an interference point that is part of the funnel surface of a nose piece assembled in the connector body.

5. The method of claim 1 wherein the step of using an interference point includes using an interference point in the connector body at least 1 mm from the interface end.

6. The method of claim 1 wherein the step of orienting the optical fiber in the alignment groove includes orienting the optical fiber at an angle relative to the alignment groove.

7. The method of claim 6 wherein the step of orienting the optical fiber at an angle relative to the alignment groove includes orienting the optical fiber into the alignment groove from a height higher than an entry slot of the alignment groove.

8. The method of claim 1 further comprising, before the step of orienting the optical fiber in the alignment groove, causing the optical fiber to pre-buckle.

9. The method of claim 8 wherein the optical fiber is within a fiber optic connector body, and the step of causing the optical fiber to pre-buckle includes engaging the optical fiber against a pre-buckling protrusion within the connector body.

10. An optical connection system comprising:
    a fiber optic connector including a connector body having an interface end and an internal cavity, the fiber optic connector also including an optical fiber that extends through the cavity of the connector body, the optical fiber having a ferrule-less end portion that is accessible at the interface end of the connector body; the internal cavity including a buckling cavity with a dimension between a floor and ceiling, and an exit cavity with a diameter smaller than the dimension of the buckling cavity;
    a fiber optic adapter including an adapter port for receiving the interface end of the connector body, the fiber optic adapter including a fiber alignment groove for receiving the ferrule-less end portion of the optical fiber when the interface end of the connector body is inserted into the adapter port; and
    the connector body having an interference point at least 1.5 mm from a mid-plane of the adapter and projecting into the connector body internal cavity such that when the end portion of the optical fiber contacts the alignment groove and elastically flexes, the interference point assists in forming a curved profile of the flexed fiber, and the inherent elasticity of the flexed optical fiber assists in retaining the end portion of the optical fiber in contact with the alignment groove; and
    wherein the exit cavity is defined by first and second opposite ends, the first end being at the interface end, and the second end being at the interference point.

11. The connection system of claim 10 wherein the interference point is at least 3 mm from the mid-plane of the adapter.

12. The connection system of claim 10 wherein the interference point is no greater than 7 mm from the mid-plane of the adapter.

13. The connection system of claim 10 wherein the connector body includes a nose piece assembled therein, the nose piece having a funnel surface defining the interference point.

14. The connection system of claim 10 wherein the interference point is at least 1 mm from the interface end of the connector body.

15. The connection system of claim 10 wherein the interference point is no greater than 6 mm from the interface end of the connector body.

16. The connection system of claim 10 wherein the diameter of the exit cavity is at least 10 microns larger than the diameter of the fiber.

17. The connection system of claim 10 wherein the diameter of the exit cavity is no greater than 300 microns larger than the diameter of the fiber.

18. The connection system of claim 10 wherein the diameter of the exit cavity is about 70-80 microns larger than the diameter of the fiber.

19. The connection system of claim 10 further including a pre-buckling protrusion that engages the optical fiber within the buckling cavity causing the optical fiber to have a pre-buckled configuration prior to connecting another connector to the other connector.

20. The connection system of claim 10 wherein the buckling cavity has a bottom wall defining a cradle for holding the fiber, the cradle having a V-shaped groove.

21. The connection system of claim 10 wherein the fiber optic adapter includes an alignment device including a housing with opposite entry slots and defining the fiber alignment groove.

22. An optical connection system comprising:
a fiber optic connector including a connector body having an interface end, the fiber optic connector also including an optical fiber that extends through the connector body,
the optical fiber having a ferrule-less end portion that is accessible at the interface end of the connector body,
the connector body defining an interior fiber buckling region for allowing the optical fiber to buckle within the connector body when the fiber optic connector is connected to another fiber optic connector, and
wherein the fiber optic connector is constructed and arranged to cause the optical fiber to have a pre-buckled configuration having a fiber portion with a first buckling curvature prior to securing the connector to the other connector, wherein the fiber optic connector includes a pre-buckling protrusion that engages the optical fiber at an intermediate location along the first buckling curvature, wherein the fiber optic connector is constructed and arranged such that the fiber portion can further buckle from the first buckling curvature to a second buckling curvature having an increased amplitude as compared to the first buckling curvature to accommodate axial movement of the optical fiber when the fiber optic connector is connected to another fiber optic connector, and wherein the fiber portion displaces from the pre-buckling protrusion when the fiber portion buckles from the first buckling curvature to the second buckling curvature.

23. The optical connection system of claim 22 wherein the optical fiber descends downward from the pre-buckling protrusion as it extends toward the interface end of the connector body.

24. The optical connection system of claim 22 wherein the pre-buckling protrusion extends upward from a bottom surface defining the interior fiber buckling region.

25. The optical connection system of claim 22 wherein the connector body includes a fiber exit hole at the interface end, the fiber exit hole includes an interference point in engagement with the optical fiber.

26. The optical connection system of claim 25 wherein the interference point is spaced from the pre-buckling protrusion.

27. The optical connection system of claim 25 wherein the pre-buckling protrusion extends from a bottom surface of the interior fiber buckling region and the interference point is along a top wall of the interior fiber buckling region.

28. A method of connecting first and second fiber optic connectors, the method comprising:
providing the first fiber optic connector including a connector body having an interface end, the fiber optic connector also including an optical fiber that extends through the connector body, the optical fiber having a ferrule-less end portion that is accessible at the interface end of the connector body;
providing the second fiber optic connector including a connector body having an interface end, the fiber optic connector also including an optical fiber that extends through the connector body, the optical fiber having a ferrule-less end portion that is accessible at the interface end of the connector body;
orienting the interface end of the first fiber optic connector into an adapter port of a fiber optic adapter;
orienting the optical fiber of the first fiber optic connector in an alignment groove of an alignment device;
orienting the interface end of the second fiber optic connector into the adapter port of the fiber optic adapter and the optical fiber of the second fiber optic connector in the alignment groove of the alignment device;
causing the optical fiber of one of the first or second fiber optic connectors to elastically flex;
using an interference point to assist in forming a curved profile of the flexed fiber, the interference point being at least 1.5 mm from a mid-plane of the adapter; and
using inherent elasticity of the flexed optical fiber to assist in retaining the end portion of the optical fiber in contact with the alignment groove.

29. The method of claim 28 wherein the step causing the optical fiber of one of the first or second fiber optic connectors to elastically flex includes causing the flexed fiber to buckle.

30. An optical connection system comprising:
a fiber optic connector including a connector body having an interface end, the fiber optic connector also including an optical fiber that extends through the connector body, the optical fiber having a ferrule-less end portion that is accessible at the interface end of the connector body; the connector body further including an internal cavity accommodating the fiber, the internal cavity including a buckling cavity with a dimension between a floor and ceiling, and an exit cavity with a diameter smaller than the dimension of the buckling cavity, and the diameter of the exit cavity being about 70-80 microns larger than the diameter of the fiber;
a fiber optic adapter including an adapter port for receiving the interface end of the connector body, the fiber optic adapter including a fiber alignment groove for receiving the ferrule-less end portion of the optical fiber when the interface end of the connector body is inserted into the adapter port; and
the connector body having an interference point projecting into the cavity of the connector body at least 1.5 mm from a mid-plane of the adapter such that when the end portion of the optical fiber contacts the alignment groove and elastically flexes, the interference point assisting in forming a curved profile of the flexed fiber, and the inherent elasticity of the flexed optical fiber assisting in retaining the end portion of the optical fiber in contact with the alignment groove.

31. The connection system of claim 30 further including a pre-buckling protrusion that engages the optical fiber within the buckling cavity causing the optical fiber to have a pre-buckled configuration prior to connecting the connector to the other connector.

32. The connection system of claim 30 wherein the buckling cavity has a bottom wall defining a cradle for holding the fiber, the cradle having a V-shaped groove.

33. The connection system of claim 30 wherein the fiber optic adapter includes an alignment device including a housing with opposite entry slots and defining the fiber alignment groove.

* * * * *